US012657187B2

(12) United States Patent
Johnson et al.

(10) Patent No.: US 12,657,187 B2
(45) Date of Patent: Jun. 16, 2026

(54) TEXT-TO-STRUCTURED QUERY LANGUAGE QUERY GENERATION USING QUERY LOGS AND DATA PROFILING

(71) Applicant: AT&T Intellectual Property I, L.P., Atlanta, GA (US)

(72) Inventors: Theodore Johnson, New York, NY (US); Vladislav Shkapenyuk, New York, NY (US); Divesh Srivastava, Summit, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 18/805,437

(22) Filed: Aug. 14, 2024

(65) Prior Publication Data

US 2026/0050591 A1     Feb. 19, 2026

(51) Int. Cl.
*G06F 16/2452*     (2019.01)
*G06F 16/242*     (2019.01)

(52) U.S. Cl.
CPC ...... *G06F 16/24522* (2019.01); *G06F 16/243* (2019.01)

(58) Field of Classification Search
CPC .......................... G06F 16/24522; G06F 16/243
See application file for complete search history.

(56) References Cited

U.S. PATENT DOCUMENTS

| | | | | |
|---|---|---|---|---|
| 2022/0198294 A1* | 6/2022 | Schneuwly | ....... | G06F 16/24564 |
| 2022/0261228 A1* | 8/2022 | Schneuwly | .............. | G06N 5/02 |
| 2023/0128200 A1* | 4/2023 | Clement | ................ | G06N 3/084 |
| | | | | 717/106 |
| 2023/0186161 A1* | 6/2023 | Arthur | .................... | G06F 40/58 |
| | | | | 704/2 |

FOREIGN PATENT DOCUMENTS

CN     114020768 A   *   2/2022   .........   G06F 16/2433

OTHER PUBLICATIONS

Liu, A Survey of NL2SQL with Large Language Models: Where are we, and where are we going? pp. 1-31, Aug. 9, 2024.*
Maamari, End-to-end Text-to-SQL Generation within an Analytics Insight Engine, pp. 1-6, Jun. 17, 2024.*
Yu, SyntaxSQLNet: Syntax Tree Networks for Complex and Cross-Domain Text-to-SQL Task, pp. 1-11, Oct. 25, 2018.*
Kumar, Deep Learning Driven Natural Languages Text to SQL Query Conversion: A Survey, pp. 1-18 (Year: 2022).*
Pourreza DIN-SQL: Decomposed In-Context Learning of Text-to-SQL with Self-Correction, pp. 1-34, Nov. 2, 2023.*

* cited by examiner

*Primary Examiner* — Albert M Phillips, III

(57)     ABSTRACT

In one example, a method performed by a processing system including at least one processor includes automatically inferring metadata about a structured query language database, constructing, based on the metadata, a prompt for generating a new structured query language query to be executed against the structured query language database, and providing the prompt to a language model for use in generating the new structured query language query.

20 Claims, 4 Drawing Sheets

100

100

```
select word, orig_port_label, count(*)
            from (
    select orig_port_label, explode
(reexp_extract_all (url,"([a-zA-Z0-
            9_]+)",1))...
```

116

SERVER(S) 126

UE 112

UE 114

ACCESS NETWORK 122

DBS 132

INTERNET 124

EDGE ROUTER 130

TABLES 120

CORE NETWORK 102

DB 106

AS 104

EDGE ROUTER 128

QUERY LOGS 118

ACCESS NETWORK 120

UE 108

UE 110

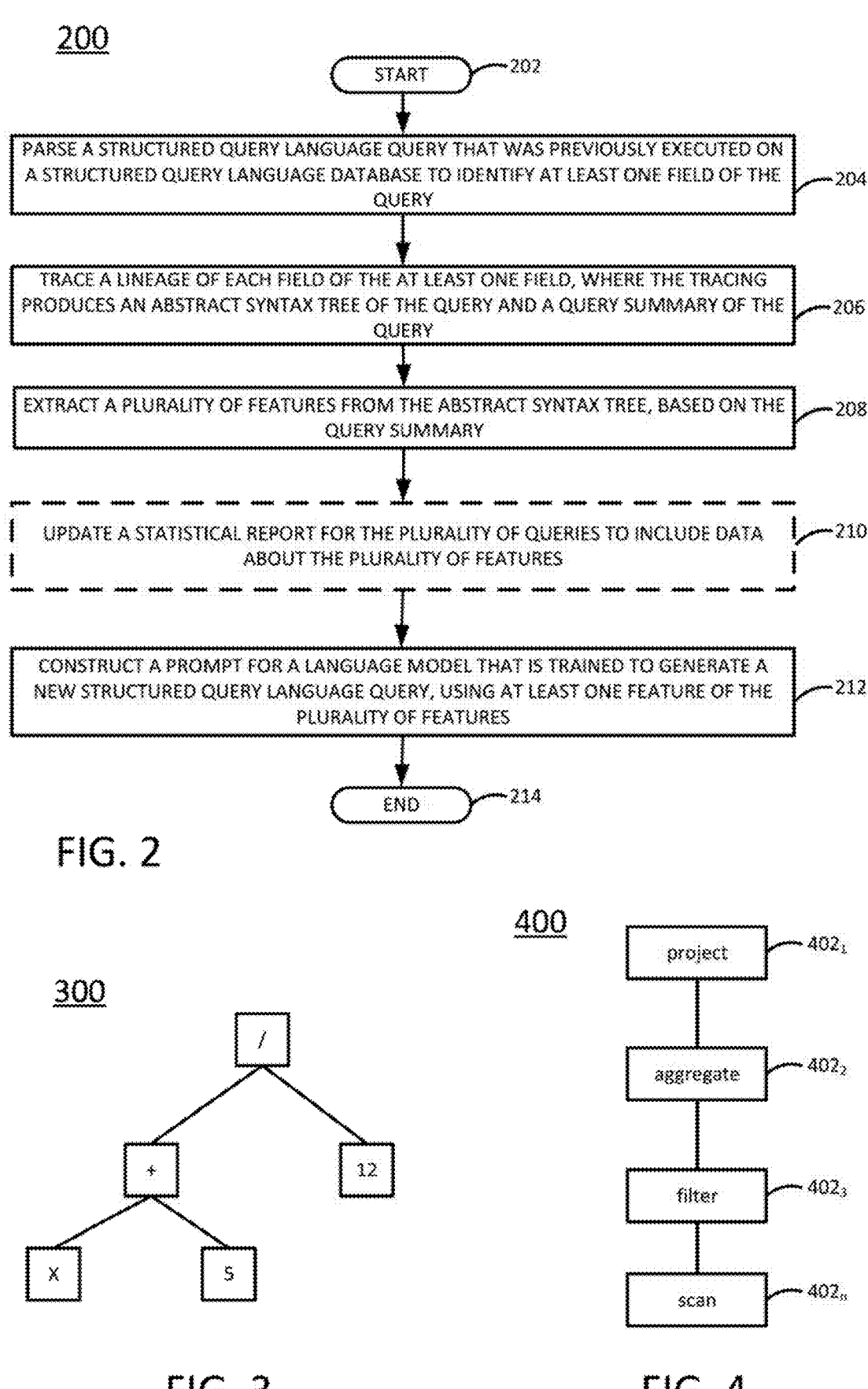

200

START —202

PARSE A STRUCTURED QUERY LANGUAGE QUERY THAT WAS PREVIOUSLY EXECUTED ON A STRUCTURED QUERY LANGUAGE DATABASE TO IDENTIFY AT LEAST ONE FIELD OF THE QUERY —204

TRACE A LINEAGE OF EACH FIELD OF THE AT LEAST ONE FIELD, WHERE THE TRACING PRODUCES AN ABSTRACT SYNTAX TREE OF THE QUERY AND A QUERY SUMMARY OF THE QUERY —206

EXTRACT A PLURALITY OF FEATURES FROM THE ABSTRACT SYNTAX TREE, BASED ON THE QUERY SUMMARY —208

UPDATE A STATISTICAL REPORT FOR THE PLURALITY OF QUERIES TO INCLUDE DATA ABOUT THE PLURALITY OF FEATURES —210

CONSTRUCT A PROMPT FOR A LANGUAGE MODEL THAT IS TRAINED TO GENERATE A NEW STRUCTURED QUERY LANGUAGE QUERY, USING AT LEAST ONE FEATURE OF THE PLURALITY OF FEATURES —212

END —214

400 project — 402₁ aggregate — 402₂ filter — 402₃ scan — 402ₙ

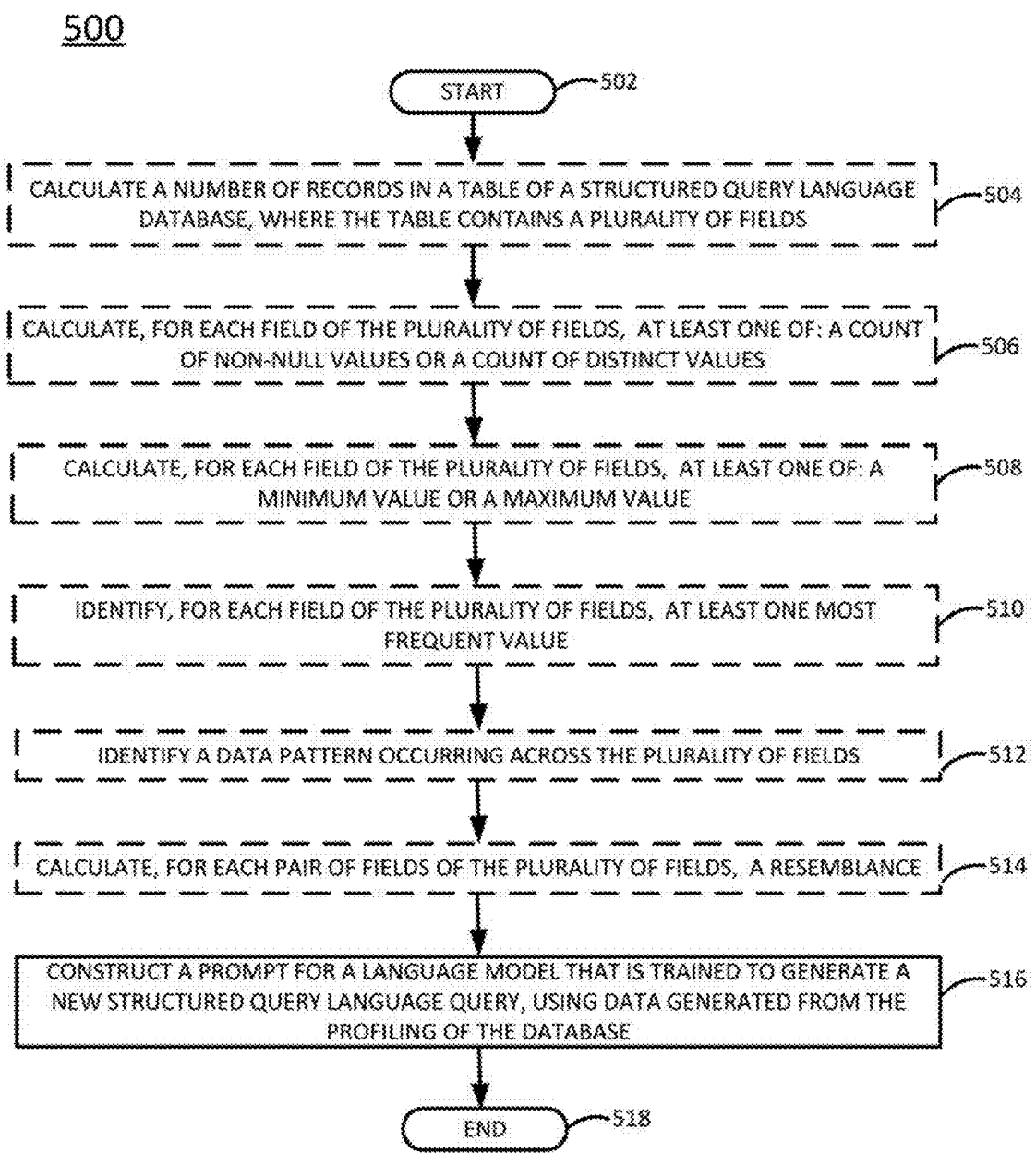

START ~502

CALCULATE A NUMBER OF RECORDS IN A TABLE OF A STRUCTURED QUERY LANGUAGE DATABASE, WHERE THE TABLE CONTAINS A PLURALITY OF FIELDS ~504

CALCULATE, FOR EACH FIELD OF THE PLURALITY OF FIELDS, AT LEAST ONE OF: A COUNT OF NON-NULL VALUES OR A COUNT OF DISTINCT VALUES ~506

CALCULATE, FOR EACH FIELD OF THE PLURALITY OF FIELDS, AT LEAST ONE OF: A MINIMUM VALUE OR A MAXIMUM VALUE ~508

IDENTIFY, FOR EACH FIELD OF THE PLURALITY OF FIELDS, AT LEAST ONE MOST FREQUENT VALUE ~510

IDENTIFY A DATA PATTERN OCCURRING ACROSS THE PLURALITY OF FIELDS ~512

CALCULATE, FOR EACH PAIR OF FIELDS OF THE PLURALITY OF FIELDS, A RESEMBLANCE ~514

CONSTRUCT A PROMPT FOR A LANGUAGE MODEL THAT IS TRAINED TO GENERATE A NEW STRUCTURED QUERY LANGUAGE QUERY, USING DATA GENERATED FROM THE PROFILING OF THE DATABASE ~516

END ~518

TEXT-TO-STRUCTURED QUERY LANGUAGE QUERY GENERATION USING QUERY LOGS AND DATA PROFILING

The present disclosure relates generally to data management, and relates more particularly to devices, non-transitory computer-readable media, and methods for generating text-to-structured query language queries using query logs and data profiling.

BACKGROUND

A relational database is a type of database that stores data in tabular form, where the rows and columns represent different data attributes and the relationships between the different data attributes. Data stored in these relational databases may be managed using structured query language (SQL), which is a programming language that is used in many applications. SQL statements may be used to store, update, remove, search, and retrieve data from a relational database.

SUMMARY

In one example, the present disclosure describes a device, computer-readable medium, and method for generating text-to-structured query language queries using query logs and data profiling. For instance, in one example, a method performed by a processing system including at least one processor includes automatically inferring metadata about a structured query language database, constructing, based on the metadata, a prompt for generating a new structured query language query to be executed against the structured query language database, and providing the prompt to a language model for use in generating the new structured query language query.

In another example, a method performed by a processing system including at least one processor includes parsing a structured query language query that was previously executed on a structured query language database to identify at least one field of the query, tracing a lineage of each field of the at least one field, where the tracing produces an abstract syntax tree of the structured query language query and a query summary of the structured query language query, extracting a plurality of features from the abstract syntax tree, based on the query summary, and constructing a prompt for a language model that is trained to generate a new structured query language query, using at least one feature of the plurality of features.

In another example, a method performed by a processing system including at least one processor includes performing a statistical analysis over a plurality of fields of a plurality of tables contained in a structured query language database to generate a profile for the structured query language database and constructing a prompt for a language model that is trained to generate a new structured query language query to be executed against the structured query language database, using data from the profile.

BRIEF DESCRIPTION OF THE DRAWINGS

The teachings of the present disclosure can be readily understood by considering the following detailed description in conjunction with the accompanying drawings, in which:

FIG. 2 illustrates a flowchart of an example method for generating text-to-structured query language queries using query logs, according to the present disclosure;

FIG. 3 illustrates an example abstract syntax tree;

FIG. 4 illustrates an example query plan comprising a plurality of operators;

FIG. 5 illustrates a flowchart of an example method for generating text-to-structured query language queries using database profiling, according to the present disclosure.

To facilitate understanding, identical reference numerals have been used, where possible, to designate identical elements that are common to the figures.

DETAILED DESCRIPTION

Figure 1:
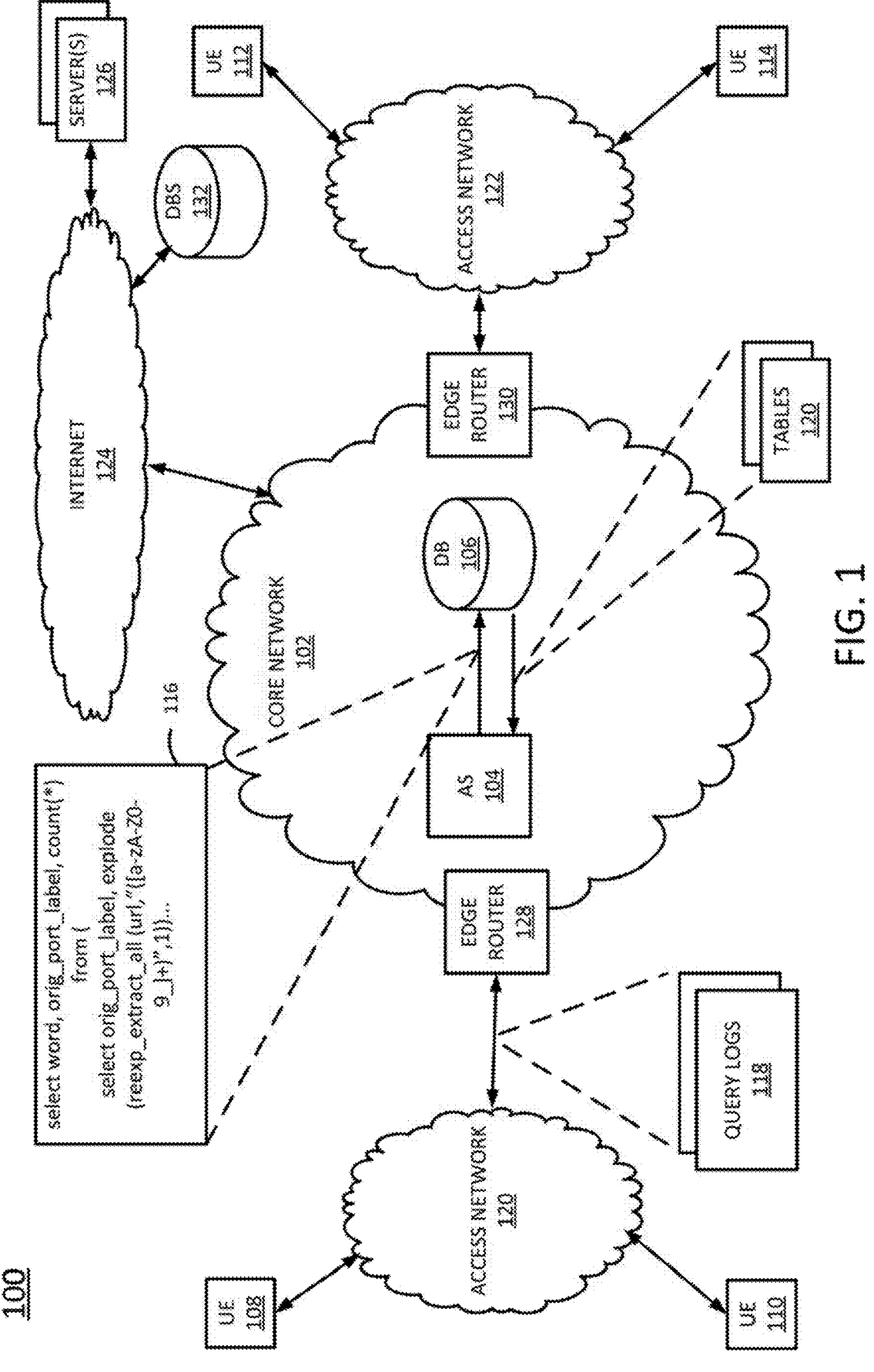
FIG. 1 illustrates an example system in which examples of the present disclosure for generating text-to-structured query language queries using query logs and data profiling may operate.

In one example, the present disclosure provides a system, method, and non-transitory computer readable medium for generating text-to-structured query language queries using query logs and data profiling. As discussed above, data stored in relational databases may be managed using SQL, which is a programming language that is used in many applications. SQL statements may be used to store, update, remove, search, and retrieve data from a relational database.

Recently, language models including large language models (LLMs) and small language models (SLMs) have been shown to be effective at generating SQL queries when trained on large textual data sets that include SQL queries and public documents describing terms and concepts commonly used in specialized domains. For instance, LLMs have been developed that are capable of writing sophisticated SQL queries with little to no description of the tables to be queried. In addition to understanding SQL, LLMs have the ability to make "common sense" associations between words and phrases and their abbreviations in field names.

To be practically useful, however, the table(s) to be queried should be described to the LLM using prompt engineering, i.e., the addition of helpful context to a user's question. For instance, providing even just the schema of a table to the LLM can be surprisingly effective. However, while existing benchmarks for prompt engineering have proven to be valuable in terms of evaluating text-to-SQL prototypes, they do not tend to reflect the real-world difficulties in text-to-SQL query generation. For instance, the schemas associated with these benchmarks are often simple, the fields and tables have obvious names, and foreign keys are explicit in the schemas. No formulas (other than obvious aggregations) are required to extract information, and the choice of field to constrain is obvious. However, actual business databases tend to be far more complex and are often poorly documented. Information about primary and foreign keys is often missing, complex formulae for computing output and comparing fields are not documented, and the proper choice of data constraints is often unclear. For instance, an LLM might be able to identify that "st_cd" is a common abbreviation for "state code," but might not be able to determine whether the state of Texas is represented as "Texas" or "TX."

One approach to obtaining this missing information is to create prompts associated with keywords or key phrases based on input from human subject matter experts. For instance, a subject matter expert may be able to identify the purpose of a table, identify the keys and foreign keys of a table, provide descriptions of (and possibly data formats for) individual fields in a table. This information can be stored in a database so that the information can be added to a future prompt. For instance, continuing the state code example above, the phrase "st_cd is a two-character state code" may be added to a prompt related to the st_cd field to indicate that states should be represented by their two-character abbreviation (e.g., TX for Texas). While subject matter expertise is valuable, it is also costly and demanding on the time of subject matter experts who are providing their input. Thus, while potentially feasible for documenting a small number of tables, this approach does not scale well for larger efforts, such as documenting thousands of tables. Moreover, it is unlikely that a single subject matter expert will be aware of all of the intricacies of the thousands of tables available to the data analyst, so input from multiple subject matter experts might be necessary for completeness.

Examples of the present disclosure provide a scalable way to perform prompt generation to enable generating text-to-SQL queries by automatically inferring metadata about a database. In one example, query features that may be useful for prompt generation may be inferred from analysis of logs of queries that were previously submitted on a table. The inferred query features may then be translated into prompts and indexed in a string similarity database. Thus, queries that were previously written by subject matter experts might be mined for useful information that may not be well-documented. In further examples, query features that may be useful for prompt generation may be inferred through database profiling, i.e., the performance of statistical analysis on one or more tables in a database. Thus, information may be detected in the database tables themselves that helps to focus the generation of queries by identifying fields to reference, data formats to be used, or the like. In further examples still, both query log analysis and database profiling may be used together to improve the generation of prompts for text-to-SQL queries. The disclosed approaches may assist an LLM in generating prompts for new SQL queries, even for SQL databases that the LLM has not previously encountered.

Although examples of the present disclosure are discussed below within the context of LLMs, it will be appreciated that the same techniques could be used to generate prompts for query generation by other types of language models, including SLMs. These and other aspects of the present disclosure are discussed in further detail with reference to FIGS. 1-6, below.

To further aid in understanding the present disclosure, FIG. 1 illustrates an example system 100 in which examples of the present disclosure for generating text-to-structured query language queries using query logs and data profiling may operate. The system 100 may include any one or more types of communication networks, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wired network, a wireless network, and/or a cellular network (e.g., 2G-5G, a long term evolution (LTE) network, and the like) related to the current disclosure. It should be noted that an IP network is broadly defined as a network that uses Internet Protocol to exchange data packets. Additional example IP networks include Voice over IP (VOIP) networks, Service over IP (SoIP) networks, the World Wide Web, and the like.

In one example, the system 100 may comprise a core network 102. The core network 102 may be in communication with one or more access networks 120 and 122, and with the Internet 124. In one example, the core network 102 may functionally comprise a fixed mobile convergence (FMC) network, e.g., an IP Multimedia Subsystem (IMS) network. In addition, the core network 102 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VOIP) telephony services. In one example, the core network 102 may include at least one application server (AS) 104, at least one database (DB) 106, and a plurality of edge routers 128-130. For ease of illustration, various additional elements of the core network 102 are omitted from FIG. 1.

In one example, the access networks 120 and 122 may comprise Digital Subscriber Line (DSL) networks, public switched telephone network (PSTN) access networks, broadband cable access networks, Local Area Networks (LANs), wireless access networks (e.g., an IEEE 802.11/Wi-Fi network and the like), cellular access networks, $3^{rd}$ party networks, and the like. For example, the operator of the core network 102 may provide a cable television service, an IPTV service, or any other types of telecommunication services to subscribers via access networks 120 and 122. In one example, the access networks 120 and 122 may comprise different types of access networks, may comprise the same type of access network, or some access networks may be the same type of access network and other may be different types of access networks. In one example, the core network 102 may be operated by a telecommunication network service provider (e.g., an Internet service provider, or a service provider who provides Internet services in addition to other telecommunication services). The core network 102 and the access networks 120 and 122 may be operated by different service providers, the same service provider or a combination thereof, or the access networks 120 and/or 122 may be operated by entities having core businesses that are not related to telecommunications services, e.g., corporate, governmental, or educational institution LANs, and the like.

In one example, the access network 120 may be in communication with one or more user endpoint devices 108 and 110. Similarly, the access network 122 may be in communication with one or more user endpoint devices 112 and 114. The access networks 120 and 122 may transmit and receive communications between the user endpoint devices 108, 110, 112, and 114, between the user endpoint devices 108, 110, 112, and 114, the server(s) 126, the AS 104, other components of the core network 102, devices reachable via the Internet in general, and so forth. In one example, each of the user endpoint devices 108, 110, 112, and 114 may comprise any single device or combination of devices that may comprise a user endpoint device, such as computing system 600 depicted in FIG. 6, and may be configured as described below. For example, the user endpoint devices 108, 110, 112, and 114 may each comprise a smart phone, a tablet computer, a laptop computer, a gaming device, a wearable smart device (e.g., a smart watch, a head mounted display, or the like), an IoT device, a bank or cluster of such devices, and the like.

In one example, one or more servers 126 and one or more databases 132 may be accessible to user endpoint devices 108, 110, 112, and 114 via Internet 124 in general. The server(s) 126 and DBs 132 may be associated with Internet software applications that may exchange data with the user endpoint devices 108, 110, 112, and 114 over the Internet 124. In one example, at least some of the servers 126 and DBs 132 host applications that plan, optimize, and execute SQL queries submitted by the user endpoint devices 108, 110, 112, and 114.

In accordance with the present disclosure, the AS 104 may be configured to provide one or more operations or functions in connection with examples of the present disclosure for generating text-to-structured query language queries using query logs and data profiling, as described herein. For instance, in one example, the AS 104 may be part of a database management system. In a further example, the AS 104 may include a large language model that is trained to automatically generate prompts that can be used to formulate SQL queries, such as SQL query 116, for execution against a database, such as the DB 106 or the DB 132.

In one example, the AS 104 may collect query logs 118 from one or more sources including UEs 108 and 110, the AS 104 itself, servers 126, or other sources. The query logs 118 may comprise a histories of queries that were previously executed against one or more tables contained in the database 106 or database 132. As discussed in further detail in connection with FIG. 2, which describes one example of a method for generating text-to-structured query language queries using query logs, the AS 104 may parse the queries contained in the query logs 118 for fields of the tables that were queried, and then trace the lineages of these fields to identify which table(s) the fields come from or appear in and what formulas were used to compute the values in the fields. Based on the results of the tracing, the AS 104 may generate a statistical report for the query logs 118 that includes data about the extracted features, such as frequencies of occurrence for each of the extracted features. The frequencies of occurrence may help the LLM to identify which extracted features are most important or most likely to return useful results when used in generating a prompt for a new SQL query 116 to be executed against the database 106 or 132.

In a further example, the AS 104 may collect data, such as tables 120, directly from the database 106 or database 132. The AS 104 may perform statistical analyses on data extracted from the tables 120 in order to determine information and/or patterns related to the database 106 or 132, such as the number of records contained in the tables 120, the number of non-null and/or distinct values appearing in fields of the tables 120, most frequently occurring values in the fields of the tables 120, minimum and/or maximum values appearing in fields of the tables 120, resemblances between fields of the tables 120, and/or other data patterns that can be observed in the tables 120. From this information, the AS 104 may build a profile of the database 106 or 132 that helps to focus the generation of queries by identifying fields to reference, data formats to be used, or the like.

The AS 104 may generate prompts that may be used by the LLM to automatically generate SQL queries for execution against the database 106 or 132. Prompts may be generated using information determined through analysis of query logs, information determined through profiling of the databases 106 or 132, or information determined through both techniques. Once the LLM has generated an SQL query based on one or more prompts, a query planner and/or optimizer of the AS 104 may refine or optimize the SQL query for execution against a database, such as DB 106 or DB 132.

Figure 6:
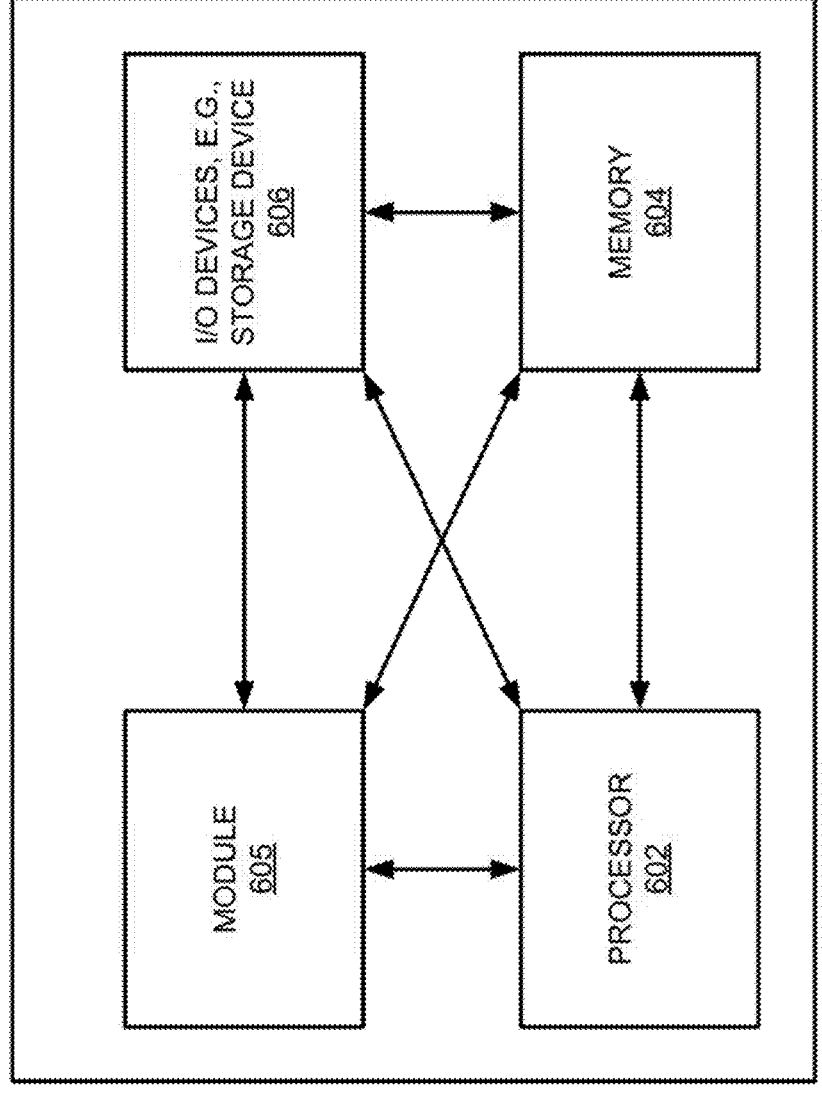
FIG. 6 depicts a high-level block diagram of a computing device specifically programmed to perform the functions described herein.

The AS 104 may comprise one or more physical devices, e.g., one or more computing systems or servers, such as computing system 600 depicted in FIG. 6, and may be configured as described below. It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 6 and discussed below) or multiple computing devices collectively configured to perform various steps, functions, and/or operations in accordance with the present disclosure. In one example, the DB 106 may comprise a physical storage device integrated with the AS 104 (e.g., a database server or a file server), or attached or coupled to the AS 104, in accordance with the present disclosure.

In one example, the AS 104 may load instructions into a memory, or one or more distributed memory units, and execute the instructions for generating text-to-structured query language queries using query logs and data profiling, as described herein. For instance, example methods for transforming structured query language queries to expedite query execution are discussed in further detail below in connection with FIG. 2 and FIG. 5.

It should be noted that the system 100 has been simplified. Thus, those skilled in the art will realize that the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements.

For example, the system 100 may include other network elements (not shown) such as border elements, routers, switches, policy servers, security devices, gateways, a content distribution network (CDN) and the like. For example, portions of the core network 102, access networks 120 and 122, and/or Internet 124 may comprise a content distribution network (CDN) having ingest servers, edge servers, and the like. Similarly, although only two access networks, 120 and 122 are shown, in other examples, access networks 120 and/or 122 may each comprise a plurality of different access networks that may interface with the core network 102 independently or in a chained manner. For example, UE devices 108, 110, 112, and 114 may communicate with the core network 102 via different access networks, user endpoint devices 110 and 112 may communicate with the core network 102 via different access networks, and so forth. Thus, these and other modifications are all contemplated within the scope of the present disclosure.

To further aid in understanding the present disclosure, FIG. 2 illustrates a flowchart of an example method 200 for generating text-to-structured query language queries using query logs, according to the present disclosure. In one example, the method 200 may be performed by the AS 104 or by another element of the core network 102 illustrated in FIG. 1. However, in other examples, the method 200 may be performed by another device, such as the computing system 600 of FIG. 6, discussed in further detail below. For the sake of discussion, the method 200 is described below as being performed by a processing system (where the processing system may comprise a component of the AS 104 or by another element of the core network 102, the computing system 600, or another device).

The method 200 begins in step 202. In step 204, the processing system may parse a structured query language query that was previously executed on a database to identify at least one field of the query.

Most database management systems log the queries which have been executed on the database and keep the query log for a period of time (e.g., six months). The query log may be useful for many tasks, including work effort optimization (e.g., identifying which tables are frequently accessed versus which tables are never or are infrequently accessed), query optimization (e.g., identifying which fields are commonly constrained, suggesting new indices or partitioning strategies, etc.), and security audits (e.g., searching for evidence of SQL injection). The need to analyze or cross-translate SQL queries has led to the development of many open-source SQL parsers, each of which uses a grammar (which is often recursive) to parse SQL queries. The result of a successful parse is referred to as an abstract syntax tree (AST), which reflects the steps performed in the parsing.

For instance, the grammar for a simple mathematical expression consisting of adding, subtracting, multiplying, and dividing variables might be:
Expression:
    (Expression)
    Expression+Expression
    Expression−Expression
    Expression*Expression
    Expression/Expression
    Constant
    Name
;

FIG. 3 illustrates an example abstract syntax tree 300. The example AST 300 illustrates the AST for the expression (X+5)/12, based on the above grammar. An AST such as the AST 300 is readily processed by computer programs for tasks including code compilation, code interpretation, and code analysis.

In some examples, the query log may contain the query plans, rather than the query text, for the plurality of queries. A query plan is a collection of processing nodes, where each processing node implements a small program (e.g., an operator). The program may be based on relational algebra, but there may be many extensions. Example operators might include, for instance, table scan, filtering, join, aggregation, and projection (i.e., computing values and/or eliminating fields). For instance, an example query might be:
SELECT bus_yr_nbr,
    SUM (CASE WHEN wirls_prfrmn_mtrlty_cd IS NOT NULL THEN trans_amt END) AS direct_wireless_spend,
    SUM (CASE WHEN wirls_prfrmn_mtrlty_cd IS NULL THEN trans_amt END) AS indirect_wireless_spend
    FROM ECDW.SDW.accounting_table
    WHERE uop_cd LIKE 'CELL %' AND bus_yr_nbr=2020
    GROUP BY bus_yr_nbr
FIG. 4 illustrates an example query plan 400 comprising a plurality of operators 402₁-402ₙ (hereinafter individually referred to as an "operator 402" or collectively referred to as "operators 402"). The example query plan 400 illustrates a query plan for the above example query. In a well-documented query plan, each operator is annotated with specialization of the task the operator is to perform. For instance, the scan operator 402ₙ of FIG. 4 might be annotated with: ECDW.SDW.accounting_table. The filter operator 402₃ of FIG. 4 might be annotated with: uop_cd LIKE 'CELL %' AND bus_yr_nbr=2020. The aggregate operator 4022 of FIG. 4 might be annotated with the aggregate functions and group-by key.

A well-documented query plan is equivalent to the text of an SQL query since the query plan is generated by the text representation, and a textual SQL query can be generated from the query plan. The query plan may also be akin to a processed abstract syntax tree, since the query has been broken into components. Some elements may still need to be parsed, however. For instance, the example annotation for the filter operator 402₃ of FIG. 4 needs to be parsed as the predicate entry in the SQL grammar, so that the components of the filter operator 402₃ are visible to computer processing.

Referring back to FIG. 2, in step 206, the processing system may trace a lineage of each field of the at least one field, where the tracing produces an abstract syntax tree of the query and a query summary of the query.

Lineage tracing involves identifying, for each field name referenced in a query, which table(s) the named field comes from or appears in and what formula was used to compute the values in the field. For instance, for the example query:
    Select uop_cd, sum(trans_amt)
    From ECDW.SDW.accounting_table
    Where bus_yr_nbr=2020
    there is only one table referenced (i.e., ECDW.SDW.accounting_table), so all of the named fields (i.e., uop_cd, trans_amt, and bus_yr_nbr) must come from that one (default) table. This inference would hold true even if the table were associated with a range variable, such as:
    Select A.uop_cd, sum(trans_amt)
    From ECDW.SDW.accounting_table A
    Where bus_yr_nbr=2020
    In this second case, the field uop_cd is known to come from the table ECDW.SDW.accounting_table due to the range variable A. However, the fields trans_amt and bus_yr_nbr are also known to come from the table ECDW.SDW.accounting_table, because these fields are associated with the default table.

In a join query, the association between a field name and a source table is usually performed using range variables. For instance, an example join query might read as:
    Select A.uop_cd, A.trans_amt, C. country_code
    From accounting_table A, country_table C
    Where A.uop_cd=C.source_code
    In this case, it is known that the fields uop_cd and trans_amt come from the table accounting_table and that the fields country_code and source_code come from the table country_table due to the explicitly labeled range variables. However, some SQL variants may allow the user to reference a field in a join query without specifying the range variable. In this case, an example join query might read as:
    Select A.uop_cd, A.trans_amt, country_code
    From accounting_table A, country_table C
    Where A.uop_cd=C.source_code
    A database management system might accept this join query if the database management system can unambiguously identify the range variable for the field country_code. If the field country_code is a field of country_table and not a field of accounting_table, then the database management system can associate the field country_code with the range variable C and the table country_table.

There are a numbers of ways in which the processing system may attempt to trace the lineage of the fields in this example. For instance, if the schemas of the source tables are known, then the processing system may match each field against the schemas and identify the unique table containing the field name. Alternatively, if the schemas of the source tables are not known, then the processing system may label the source using a marker, such as <unknown>.

A further complication that may arise in field lineage tracing involves instances in which one or more of the range variables are sourced from a subquery rather than a table (possibly with the help of a WITH clause). An example might look like:

```
Select A.uop_cd, A.trans_amt+P.total_planned as spend_and_planned
From accounting_table A, (
    Select source_code, sum(planned_amt) as total_planned
    From planning_table
    Where country_code='USA'
    Group By source_code) P
Where A.uop_cd = P.source_code
```

In this case, the subquery P must be analyzed before the parent query can be analyzed. Using techniques discussed above, it can be determined that P.source_code is sourced from planning_table.source_code and that P.total_planned is sourced from sum(planning_table.planned.amt). A subquery summary table for the subquery P may be constructed as:

TABLE 1

| Subquery P Summary | |
| --- | --- |
| SOURCE_CODE | planning_table.source_code |
| TOTAL_PLANNED | sum(planning_table.planned_amt) |

Table 1, along with the schema of accounting_table, can then be used to resolve all of the fields in the top-level, i.e.:

TABLE 2

| Query Summary | |
| --- | --- |
| UOP_CD | accounting_table.uop_cd |
| SPEND_AND_PLANNED | accounting_table.trans_amt+ sum(planning_table.planned_amt) |

Additionally, the Where constraint of the example query can be resolved to be: accounting_table.uop_code=planning_table.source_code.

It should be noted that in SQL, it is possible to use a subquery in a predicate or a computation. The subquery generally must return a single record with a single value, or a collection of records with a single value (e.g., an IN predicate). An example subquery of this nature might be written as: trans_amt+(select sum(planned_amt) from planning_table).

Thus, to summarize the above, the processing system may begin tracing the lineage of a field referenced in a SQL query according to step 206 by converting the SQL query string to an abstract syntax tree.

Once the abstract syntax tree is acquired, the processing system may process the from clause of the SQL query. The processing system may begin by identifying, in the from clause, the default table (if any). For all range variables associated with a table, the processing system may associate the range variable name with the table name and the table schema (if any). For all range variables associated with a subquery, the processing system may recursively resolve the subquery and associate the range variables with the subquery summary.

Once the from clause is processed, the processing system may process all other elements of the SQL query. The processing system may begin processing these other elements by identifying the field names in the expressions and predicates of the SQL query. The processing system may identify the source of a field, using one or more of: the default table, the range variables, the explicit table names, or a search within the field names in the range variables from the processing of the from clause. The processing system may replace field names by adding the default table (if no range variable is specified and there is a default table), adding the table name (if the range variable is associated with a table), replacing a field name with its source as indicated in the associated subquery summary of the range variable (if the range variable is associated with a subquery summary), or determining which range variable contains the field name and then adding the table name or replacing the field name as appropriate (if the query is a join query and the field does not have a range variable).

The result of processing all of the elements of the SQL query in the above-described manner is a query summary and optional subquery summary (if applicable for the SQL query). Thus, the input of step 206 may comprise an SQL query string, while the output of step 206 may comprise an abstract syntax tree representation of the SQL summary and a query (and optional subquery) summary for the SQL query.

As discussed above, in some cases, the input of step 206 may comprise a query plan rather than a query string. In this case, each node of the query plan is effectively a subquery, and the output of step 206 may be a resolved query plan and a query (and optional subquery) summary.

In this case, the processing system may acquire the fully documented query plan and, for each terminal node of the query plan (which must necessarily scan data), create a subquery summary from the schema information contained in the query plan node text and return a schema summary.

For each node that is not a terminal node (e.g., is a child node), the processing system may recursively obtain the subquery summary. The processing system may replace each field name of the non-terminal node with the field name's definition in the appropriate subquery summary or summaries. The query plan will provide information on which subquery summary to use. The processing system may thus create a subquery summary for the non-terminal node.

In step 208, the processing system may extract features from the abstract syntax tree, based on the query summary.

In one example the plurality of features may include one or more of: a select list, a constraint, a group-by variable, a having predicate, a join table, a referenced table, a referenced field, or a subquery.

A select list may be returned as the query summary. Select list features may indicate, for instance, what kinds of information are extracted by expert users. Select list features can be augmented by at least one of: an indication of an AS clause renaming (e.g., if a field or computation is named, the name indicates the expert user's interpretation of the meaning of the field or computation) or predicates and group-by variables (e.g., an aggregate computation such as sum(planning_table.planned_amt) might be best interpreted in the context of the data constraints and the grouping of the aggregates).

Constraints may be found in the Where clause of an SQL query, and sometimes in the ON clause. One method of pre-processing constraints breaks up constraints that are joined by AND clauses. For instance, the constraint uop_cf like 'CELL %' AND (bus_yr_nbr=2022 OR bus_yr_nbr=2023) can be broken up into [uop_cf like 'CELL %', (bus_yr_nbr=2022 OR bus_yr_nbr=2023)] for most of the features to be extracted. If the input to step 206 was a query plan, the ON constraints may be found in the join node, while other constraints may be found in the filter node.

In one example, any constraints extracted as features in step 208 may include one or more of: a single-table constraint, a multi-table constraint, an ON constraint, or a join constraint. A single-table constraint is a constraint in the Where or ON clause of an SQL query (after breaking up an AND constraint) which references a single range variable. A single-table constraint shows how expert users commonly constrain input data sets. A multi-table constraint is a constraint in the Where clause of an SQL query (after breaking up an AND constraint) which references multiple range variables. A multi-table constraint indicates how tables are joined. An ON constraint is a constraint in the ON clause of an SQL query (after breaking up an AND constraint) which references multiple range variables. Constraints which reference multiple range variables have subtly different meanings in the Where versus ON clauses for left outer, right outer, full outer, and the like. A join constraint comprises a full ON constraint as well as any broken up constraints in a Where clause (or immediately following filter node). A join constraint indicates all parts of a join predicate.

In one example, any group-by variables extracted as features in step 208 comprise a list of group-by variables listed in the SQL query. Group-by variables indicate the key of the output data table.

In one example, any predicates extracted as features in step 208 are constraints on the output of an aggregation and indicate what parts of the aggregation are of interest.

In one example, any joined tables extracted as features in step 208 are collections of tables joined together, which indicate that the tables are associated with each other. In some examples, the type of join (e.g., inner, outer, etc.) can be indicated.

In one example, any referenced tables extracted as features in step 208 comprise all tables referenced in the SQL query, regardless of whether the tables are explicitly joined.

In one example, any referenced fields extracted as features in step 208 comprise all fields referenced in the SQL query. Commonly accessed fields may be considered of highest importance in this case.

In one example, any subqueries extracted as features in step 208 may indicate business logic significance. In general, the top-level query of an SQL query is considered to be the most important query, because the top-level query is the query that returns results. Features extracted from the top-level query might include one or more of: named and unnamed elements in the Select list, predicates, group-by variables, and the like. However, complex queries often use a With clause to simplify the expression of the query. In this case, a subquery may be named, and the name may indicate some business logic significance. As an example, a subquery phrased as:

```
With current_users as (
    Select uid, user_name, substr(st_code, 1, 3) as user_class
    From users
    Where lower(substr(st_code, 4, 6)) = 'active'
) ...
``` may provide instructions about how to compute current users of a service. In particular, the current users may be identified by the feature lower (substr(st_code, 4, 6), and user class may be computed from the feature substr(st_code, 1, 3). Prompts generated from these features may state, for instance, "The set of current_users are the entries in the users table where lower (substr(st_code, 4, 6)='active'" and "the user_class of current_users is computed from substr (st_code, 1, 3)."

Subqueries in the From clause which are not named using a With clause tend to be less useful, but may still provide extractable features such as fields named with an AS clause, join predicates, and constraint predicates.

Subqueries in an expression can be used in the generation of SQL query prompts if the subqueries are relatively short. For instance, the subquery user.state in (select state from state_codes where region='NE") may be useful for generating a prompt, while a longer subquery would likely confuse an LLM.

In optional step 210 (illustrated in phantom), the processing system may update a statistical report for a corpus of queries that were previously executed on the database to include data about the plurality of features.

In one example, operations of the method 200 may be repeated for a plurality of queries that were previously executed on the database (e.g., for an entire query log). A single query in isolation will, in most cases, not be a reliable representative of how a data set is used. A corpus of query texts (and/or query plans), on the other hand, is more likely to indicate the most representative features.

In some examples, after performing operations of the method 200 for a plurality of queries that were previously executed on the database, the processing system may generate a statistical report. The statistical report may be generated by first extracting features from each query of the plurality of queries (e.g., in accordance with steps 204-208 of the method 200). In some examples, extracted features may then be converted to a normal form. Normalization may include, for instance, conversion of names and keywords to lowercase, sorting lists, and/or converting literals to placeholders (e.g., st_cd='UU'). Normalization may help to compute, for each feature, a count of the feature's occurrence across the plurality of queries. Thus, the statistical report may include a list of features extracted from the plurality of queries and frequencies of occurrence for each of the extracted features. The frequencies of occurrence may help an LLM to identify which extracted features are most important or most likely to return useful results when used in generating prompts for new SQL queries.

In some cases, query logs may contain additional metadata, such as the identities of the users who submitted the queries, or the times and/or dates on which the queries were submitted. This additional metadata can be used to refine and augment the statistical report. For instance, users can be grouped into classes (e.g., accounting, planning, tax, etc.), and feature frequency can be computed on a per-class basis to determine whether certain features are more relevant for certain types of users.

In step 212, the processing system may construct a prompt for a language model that is trained to generate a new structured query language query, using at least one feature of the plurality of features.

In one example, the language model may comprise an LLM or an SLM.

In one example, a statistical report such as the report that may be generated in accordance with step 210 may provide a collection of features extracted from a corpus of SQL queries previously executed on the database. The statistical report may also indicate, for each of the features, an association with tables of the database and a frequency of occurrence of the feature across the corpus of SQL queries. When focusing on a table, the frequency of occurrence of the relevant features of the table can be computed with respect to a subset of queries from the corpus of queries that includes the table.

In one example, the processing system may generate sample prompts for each relevant feature of the table, and the sample prompts may be ranked according to the frequencies of occurrence for the feature types of the features for which the prompts were generated. In one example, the processing system may select a defined number (e.g., N) of the most frequently occurring features and use the selected features to generate prompts related to the table.

In one example, user feedback may be solicited to select and refine the prompts that are automatically generated by the processing system. For instance, a human subject matter expert may accept or reject an automatically generated prompt, or write a new prompt using features associated with a table (which have been extracted by the processing system according to operations of the method 200).

The method 200 may end in step 214.

FIG. 5 illustrates a flowchart of an example method 500 for generating text-to-structured query language queries using database profiling, according to the present disclosure. In one example, the method 500 may be performed by the AS 104 or by another element of the core network 102 illustrated in FIG. 1. However, in other examples, the method 500 may be performed by another device, such as the computing system 600 of FIG. 6, discussed in further detail below. For the sake of discussion, the method 500 is described below as being performed by a processing system (where the processing system may comprise a component of the AS 104 or by another element of the core network 102, the computing system 600, or another device).

The method 500 begins in step 502. In optional step 504 (illustrated in phantom), the processing system may calculate a number of records in a table of a structured query language query database, where the table contains a plurality of fields.

In one example, a count of the number of records in a table may provide a reasonable indication of the contents of the table and useful approaches to querying the table. For instance, a table containing one trillion records is likely to contain transaction details, while a table containing millions of records is likely to contain summaries or descriptions (e.g., of a service provider's customers). Additionally, the number of records in a table may enable better understanding of statistics related to the table.

In optional step 506 (illustrated in phantom), the processing system may calculate, for each field of the plurality of fields, at least one of: a count of non-null values or a count of distinct values.

In one example, the number of non-null values (or, alternatively, a count of null values) in a field may indicate the likelihood that the field contains relevant data. For instance, some fields may contain only null values, while other fields may contain only a few non-null values (e.g., because the field is filled only when relevant, which would make the field a useful indicator).

In one example, the number of distinct values in a field may be a useful indicator of the nature of the field. For instance, if the number of distinct values is equal to the number of records contained in the table, then the field may be a key. If the field contains a relatively large number of distinct values, then the field may contain transaction identifiers or transaction statistics. If a field contains a relatively small number of distinct values, then the field may be categorical.

In optional step 508 (illustrated in phantom), the processing system may calculate, for each field of the plurality of fields, at least one of: a minimum value or a maximum value.

In one example, minimum and maximum values of a field may indicate a range of values and can help to identify whether a query can be answered. This knowledge may be especially useful for time-related fields, which can often be identified by date or timestamp type data. For instance, if a transaction_date field has a minimum value of March of the current year and a maximum value of the current month, then the result of any query for data relating to February will be empty.

In optional step 510 (illustrated in phantom), the processing system may identify, for each field of the plurality of fields, at least one most frequent value.

In one example, a collection of the most frequent values of a field (e.g., the top M most frequent values) may provide a reasonable indication of the field's contents. For instance, information that can be extracted based on the most frequent values may include typical values, default values, and/or skewness.

Typical values may provide an indication of the field contents and format. For instance, a database analyst who is familiar with telecommunications might recognize that a field contains common language location identifier (CLLI) codes in lower case.

Default values may be provided by users instead of null values when the value of a field is unknown (instead of "does not exist"). These made-up (i.e., not observed) default values are generally simple to enter, so the default values often show up in the list of most frequent values, and there can be multiple default values. For instance, the most frequent values of an international mobile subscriber identity (IMSI) field might include 11111111111 and 99999999999, both of which are made-up values.

The skewness of a field may be estimated if the counts of the most frequent values are calculated. If a field has a uniform distribution of values, then the counts for the top M most frequent values should be close to the number of non-null values divided by the number of distinct values. If the counts for the top M most frequent values are significantly larger than this dividend, then the field may be assumed to be skewed. There are many ways in which skewness can be determined. For instance, a field may be determined to be skewed if the top M most frequent values occur with ten times the frequency that would be expected from a uniform distribution of values.

In optional step 512 (illustrated in phantom), the processing system may identify a data pattern occurring across the plurality of fields.

While the top M most frequent values may be useful for indicating how field values are formatted, the fields may also be classified in a more systematic manner. Examples of common data patterns across fields may include typical field length (e.g., the number of characters for strings or the ceiling ($\log_{10}(f)$) for integers), use of uppercase versus lowercase characters, occurrence of special characters (e.g., $, %, /, –, _, or the like), and/or common prefixes or suffixes (often the first versus last character).

In optional step 514 (illustrated in phantom) the processing system may calculate, for each pair of fields of the plurality of fields, a resemblance.

Resemblance between two fields (i.e., how many values the two fields have in common) may be a good indication as to whether the two fields are candidates for a join path. In one example, the resemblance may be calculated as a min hash. For instance, if X is the set of distinct values in a first field X, and Y is the complete set of values in a second field Y, then the resemblance between the first and second fields X and Y, Resemblance(X,Y), may be calculated as:

$$Resemblance(X, Y) = |X \cap Y|/|X \cup Y| \qquad \text{(EQN. 1)}$$

While resemblance could be computed in any one of a number of ways, if the min hash technique is used, then the contents of the first and second fields X and Y are represented by MH(X) and MH(Y), respectively. MH(X) is a collection of a number L (e.g., one hundred) of integers, computed in one example as:

$$MH(X)[i] = \text{Select } \min(hash_{(ki)(x)}) \text{ from } T \qquad \text{(EQN. 2)}$$

Where T represents the table containing the field X, and i represents the index of the hashed value, ranging from 1 to L. With these collections calculated, Resemblance(X,Y) can be estimated as:

$$Res(X, Y) = \text{sum}(MH(X)[i] == MH(Y)[i], i \text{ in } 1 \ldots L)/L \qquad \text{(EQN. 3)}$$

Computing a min hash is a simple aggregation query that results in a small summary, and summaries generated in this manner can be compared with minimal computational expense to compute the estimated resemblance for a large number of pairs of fields.

In one example, the use of min hash may be expanded to estimate the containment of the first and second fields X and Y, Cont(X,Y), according to:

$$Cont(X, Y) = \text{sum}(MH(x)[i] >= MH(Y)[i], i \text{ in } 1 \ldots L)/L \qquad \text{(EQN. 4)}$$

If Cont(X,Y) is more than a first threshold amount larger than Res(X,Y), but Cont(Y,X) is less than a second threshold amount larger or smaller than Res(X,Y), then the processing system may conclude that X is largely contained in Y.

A min hash summary has multiple uses in database profiling, including helping to find join paths between tables, helping to find fields with similar data, and helping with field classification. For instance, when finding join paths, fields with high resemblance may be good candidates for join paths, as discussed above. When finding fields with similar data, a min hash resemblance may help to identify when fields that have different names contain the same or similar data (e.g., two or more tables may use different field names for the same type of data, such as a customer categorization code). When performing field classification, min hash summaries may be built for standard data sets. For instance, a set, "Zip_5," of all 41,704 zip-5 codes may be built. If a field X hash exhibits a high (e.g., within a threshold) resemblance to Zip_5 and is also contained in Zip_5, then the processing system may conclude that X likely contains 5-digit zip codes.

Collectively, performance of steps 504-514 produces a profile of the SQL database. It should be noted that although steps 504-514 are all described above as being optional, at least one of the steps 504-514 will be performed in order to profile an SQL database according to examples of the present disclosure. That is, although it is not necessary to perform all steps of steps 504-514, execution of the method 500 will include performing any one or more of steps 504-514. In one example, the greater the number of steps 504-514 that are performed, the more useful the resultant profiling of the database will be for the purposes of generating prompts for new SQL queries.

In step 516, the processing system may generate a prompt for a language model that is trained to generate a new structured query language query, using data generated from the profiling of the database (e.g., from one or more of steps 504-514).

In one example, the language model may comprise an LLM or an SLM.

In one example, the prompt is generated from the part of the schema of the table(s) related to a user's question, or as a separate statement. When included in the schema, the prompt may be part of the comments that can be associated with a table and the table's fields. If part of the comments, the table and field names may be removed from the statement.

For instance, data from a count of the records in one or more tables of the database may be used to generate a prompt such as "Table T contains N records."

Data from a count of non-null values and/or distinct values in a field may be used to generate a prompt such as "Field T.F is Not Null in NN Not Null and has CD distinct values." Additionally, a prompt such as "Field T.F is a categorical field" may be generated if the data type and count of distinct values indicate such generation.

Data from a calculation of minimum and/or maximum values may be used to generate a prompt such as "Field T.F ranged between L and H." To reduce the prompt size, the prompt can be dropped if the data type does not indicate that the field is a timestamp field.

Data from a calculation of most frequent values may be used to generate a prompt such as "The most common values of T.F are V1, . . . , V10."

If default values are detected, data from an identification of default values may be used to generate a prompt such as "Default values of T.F include D1, . . . , Dk."

If skewness is detected, and there is an indication that the field can be a join key (e.g., either stated in the schema or through a min hash resemblance), the skewness data may be used to generate a prompt such as "Field T.F is skewed."

If a field exhibits a data pattern, then data about the data pattern may be used to generate a prompt (or prompts) related to field length, uppercase and/or lowercase characters, special characters, common prefixes and/or suffixes, or the like. For instance, if the field has a small number of possible lengths, then a prompt such as "Field T.F has N1 characters/digits X1% of the time and . . . ," may be generated. If the field has a large number of possible lengths, then a prompt such as "The length of T.F ranges from NL to NH" may be generated. If the field contains mostly upper-case or mostly lowercase characters, then a prompt such as "Field T.F is uppercase X % of the time" may be generated. If a field contains a special character in a large (e.g., more than a threshold) number of records, then a prompt such as "Field T.F contains a '–' X1% of the time and . . . " may be generated. If the field contains common prefixes or suffixes, then a prompt such as "Field T.F ends in 's' X1% of the time and . . . " may be generated.

Moreover, the min hash profiling performed in step 514 may have multiple applications in the context of prompt generation. For instance, as described above, a min hash computation could be used to find join paths. In this example, if two tables are to be joined, then joinable fields of the two tables (e.g., indicated by data type, non-null value counts, and/or distinct value counts) may have their resem-blance computed, and pairs of fields exhibiting the greatest resemblance (and/or resemblance above a threshold) may be used to generate prompts such as "Field T.F and Field S.G have an X % resemblance."

A min hash computation can also be used to classify the contents of a field, whether by comparison to a known and prepared data set or by comparison to a field with docu-mented contents. If a match is determined (e.g., based on resemblance above a threshold and/or containment values above a threshold), then a prompt such as "Field T.F is a T" or "Field T.F resembles T" (for less certain matches) can be generated.

The method 500 may end in step 518.

It should be noted that when large tables are profiled in the manner described in FIG. 5, the query time can become prohibitively long unless some performance considerations are explicitly taken into account. For instance, counts of distinct values and most frequent values may be expensive computations to execute, since these computations can require large tables to store all of the distinct values of a field. Efficient approximation algorithms for these compu-tations are built into many modern database management systems. Additionally, in very large tables, it may be nec-essary to take a representative sample (e.g., one month, one day, one hour, or the like) of data, with the understanding that some fields (e.g., timestamps) may be sampled from a limited range.

In some examples, field summarization techniques may be used in place of one or more steps of the method 500. Large language models typically ingest large bodies of background information from a variety of sources, and can naturally recognize many patterns. For instance, using a sample of ten values, an LLM might be able to identify that one field contains two-character country codes in uppercase characters and that another field contains embedded CLLI code.

While providing data samples to the LLM to improve prompt generation can be beneficial, there are also some potential drawbacks to this approach. For one, the charac-terization of a field using a sample is wordy, and LLM performance tends to decrease with increased prompt size. Moreover, actual field data can contain sensitive information such as customer account numbers.

On the other hand, if an LLM can characterize the contents of a table's field, then there is no need to disclose any particular value in the field, and a prompt may be generated that is more informative and succinct. Thus, further examples of the present disclosure may employ a field summarization technique to generate prompts. In one example, field summarization using an LLM begins by acquiring a table, the table's schema and/or description, and a field of the table. A representative sample of N values may be collected from the field. These N values may include randomly selected values or the N most frequently occurring values. A prompt may next be generated which provides a description of the table's contents (e.g., a description and/or schema), the field name of the field, and a request to summarize the N values in the representative sample. Based on this prompt, the LLM may generate a summarization of the field. In some examples, the summarization may be used in place of many of the database profiling results or calcu-lations described in connection with the method 500 (such as most frequently occurring values and data patterns).

The method 500 may be performed separately from the method 200 or in combination with the method 200 in order to further refine generated prompts for SQL queries. Although not expressly specified above, one or more steps of the method 200 or method 500 may include a storing, displaying, and/or outputting step as required for a particular application. In other words, any data, records, fields, and/or intermediate results discussed in the method can be stored, displayed and/or outputted to another device as required for a particular application. Furthermore, operations, steps, or blocks in FIG. 2 and FIG. 5 that recite a determining operation or involve a decision do not necessarily require that both branches of the determining operation be practiced. In other words, one of the branches of the determining operation can be deemed as an optional step. Furthermore, operations, steps or blocks of the above described method(s) can be combined, separated, and/or performed in a different order from that described above, without departing from the examples of the present disclosure.

FIG. 6 depicts a high-level block diagram of a computing device specifically programmed to perform the functions described herein. For example, any one or more components or devices illustrated in FIG. 1 or described in connection with the method 200 or method 500 may be implemented as the system 600. For instance, the AS 104 of FIG. 1 (such as might be used to perform the method 200 or the method 500) could be implemented as illustrated in FIG. 6. As depicted in FIG. 6, the system 600 comprises a hardware processor element 602, a memory 604, a module 605 for generating text-to-structured query language queries using query logs and data profiling, and various input/output (I/O) devices 606.

The hardware processor 602 may comprise, for example, a microprocessor, a central processing unit (CPU), or the like. The memory 604 may comprise, for example, random access memory (RAM), read only memory (ROM), a disk drive, an optical drive, a magnetic drive, and/or a Universal Serial Bus (USB) drive. The module 605 for generating text-to-structured query language queries using query logs and data profiling may include circuitry and/or logic for performing special purpose functions relating to generating prompts for SQL queries. The input/output devices 606 may include, for example, storage devices (including but not limited to, a tape drive, a floppy drive, a hard disk drive or a compact disk drive), a receiver, a transmitter, a fiber optic communications line, an output port, or a user input device (such as a keyboard, a keypad, a mouse, and the like).

Although only one processor element is shown, it should be noted that the computer may employ a plurality of processor elements. Furthermore, although only one spe-cific-purpose computer is shown in the Figure, if the method(s) as discussed above is implemented in a distrib-uted or parallel manner for a particular illustrative example, i.e., the steps of the above method(s) or the entire method(s) are implemented across multiple or parallel specific-purpose computers, then the specific-purpose computer of this Figure is intended to represent each of those multiple specific-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed method(s). In one example, instructions and data for the present module or process 605 for generating text-to-structured query language queries using query logs and data profiling can be loaded into memory 604 and executed by hardware processor element 602 to implement the steps, functions or operations as discussed above in connection with the example method 200 or example method 500. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 605 for generating text-to-structured query language queries using query logs and data profiling (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of example only, and not limitation. Thus, the breadth and scope of a preferred example should not be limited by any of the above-described example examples, but should be defined only in accordance with the following claims and their equivalents.

What is claimed is:

1. A method comprising:
    performing, by a processing system including at least one processor, a statistical analysis over a plurality of fields of a plurality of tables contained in a structured query language database to generate a profile for the structured query language database, wherein the statistical analysis comprises:
        collecting, by the processing system, a plurality of sample values from a field of the plurality of fields, wherein the plurality of sample values is collected using an approximation technique to minimize an amount of memory needed to store the plurality of sample values;
        submitting, by the processing system to a language model, a description of contents of a table of the plurality of tables in which the field is contained, a name of the field, and a request to summarize the plurality of sample values; and
        receiving, by the processing system from the language model, a summarization of the field, wherein the summarization of the field is used to generate a prompt; and
    constructing, by the processing system, the prompt for the language model, wherein the language model is trained to generate a new structured query language query to be executed against the structured query language database, using data from the profile.

2. The method of claim 1, wherein the performing statistical analysis comprises determining:
    a number of records in a table of the plurality of tables.

3. The method of claim 1, wherein the plurality of values comprises at least one of: a count of distinct values contained in the each field or a most frequent value contained in the each field.

4. The method of claim 1, wherein the performing statistical analysis comprises determining, for each field of the plurality of fields that is contained in the table, a count of non-null values contained in the each field.

5. The method of claim 1, wherein the performing statistical analysis comprises determining, for each field of the plurality of fields that is contained in the table, a count of distinct values contained in the each field.

6. The method of claim 1, wherein the performing statistical analysis comprises determining, for each field of the plurality of fields that is contained in the table, a minimum value contained in the each field.

7. The method of claim 1, wherein the performing statistical analysis comprises determining, for each field of the plurality of fields that is contained in the table, a maximum value contained in the each field.

8. The method of claim 1, wherein the performing statistical analysis comprises determining, for each field of the plurality of fields that is contained in the table, a most frequent value contained in the each field.

9. The method of claim 8, wherein a skewness of the each field is estimated from the most frequent value contained in the each field.

10. The method of claim 9, wherein the each field is assumed to be skewed when a top number of most frequent values occur in the each field at least a threshold number of times that is expected from a uniform distribution of values.

11. The method of claim 1, wherein the performing statistical analysis comprises determining a data pattern occurring across the plurality of fields.

12. The method of claim 11, wherein the data pattern comprises an observed typical field length.

13. The method of claim 11, wherein the data pattern comprises a use of uppercase versus lowercase characters.

14. The method of claim 11, wherein the data pattern comprises an occurrence of characters that are neither alphabetic nor numeric.

15. The method of claim 11, wherein the data pattern comprises repeated prefixes or suffixes.

16. The method of claim 1, wherein the performing statistical analysis comprises determining, for each pair of fields in the plurality of fields, a resemblance between the each pair of fields.

17. The method of claim 16, wherein the resemblance is calculated as a min hash.

18. The method of claim 17, wherein the min hash is expanded to estimate a containment of the each pair of fields.

19. A non-transitory computer readable medium storing instructions which, when executed by a processing system including at least one processor, cause the processing system to perform operations, the operations comprising:

performing a statistical analysis over a plurality of fields of a plurality of tables contained in a structured query language database to generate a profile for the structured query language database, wherein the statistical analysis comprises:

collecting a plurality of sample values from a field of the plurality of fields, wherein the plurality of sample values is collected using an approximation technique to minimize an amount of memory needed to store the plurality of sample values;

submitting, to a language model, a description of contents of a table of the plurality of tables in which the field is contained, a name of the field, and a request to summarize the plurality of sample values; and receiving, from the language model, a summarization of the field, wherein the summarization of the field is used to generate a prompt; and constructing the prompt for the language model, wherein the language model is trained to generate a new structured query language query to be executed against the structured query language database, using data from the profile.

20. An apparatus comprising:

a processing system including at least one processor; and a non-transitory computer readable medium storing instructions which, when executed by the processing system, cause the processing system to perform operations, the operations comprising:

performing a statistical analysis over a plurality of fields of a plurality of tables contained in a structured query language database to generate a profile for the structured query language database, wherein the statistical analysis comprises:

collecting a plurality of sample values from a field of the plurality of fields, wherein the plurality of sample values is collected using an approximation technique to minimize an amount of memory needed to store the plurality of sample values;

submitting, to a language model, a description of contents of a table of the plurality of tables in which the field is contained, a name of the field, and a request to summarize the plurality of sample values; and receiving, from the language model, a summarization of the field, wherein the summarization of the field is used to generate a prompt; and constructing the prompt for the language model, wherein the language model is trained to generate a new structured query language query to be executed against the structured query language database, using data from the profile.

* * * * *